Patented Oct. 19, 1926.

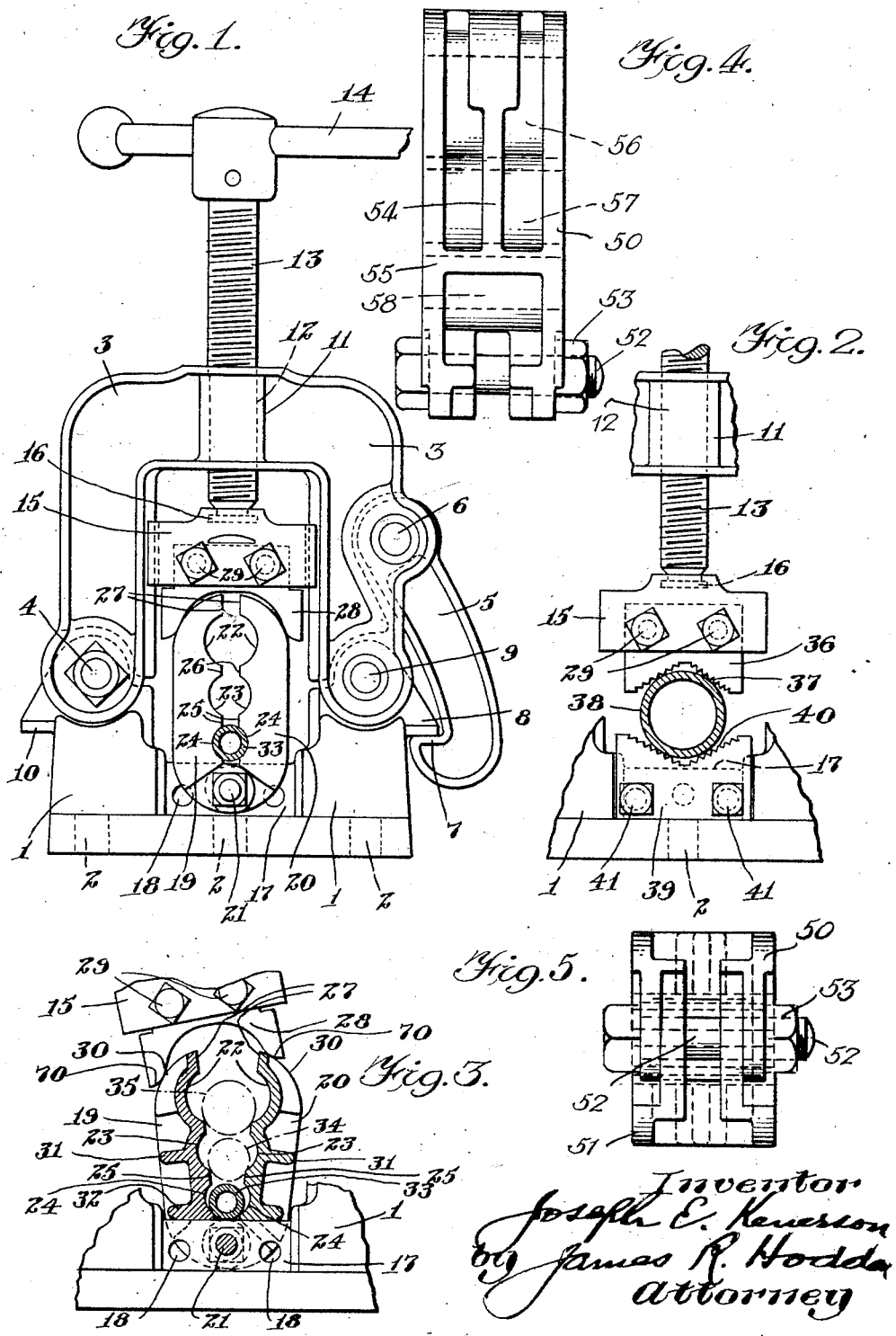

1,604,100

UNITED STATES PATENT OFFICE.

JOSEPH E. KENERSON, OF SAUGUS, MASSACHUSETTS, ASSIGNOR TO TRIMONT MANUFACTURING COMPANY, OF ROXBURY, MASSACHUSETTS, A CORPORATION OF MASSACHUSETTS.

PIPE VISE AND GRADUATED CLAMPING JAWS THEREFOR.

Application filed December 4, 1925. Serial No. 73,237.

My present invention relates to novel graduated pipe clamping jaws, and their applicability to, and interchangeability with, pipe vises of existing types, as well as for utilization in an improved hinge pipe vise.

A principal object of my invention is to provide vise jaws of simple, strong and efficient construction, by which pipes, tubing, rods and other cylindrical objects, of various sizes and diameters, may be received, automatically positioned, and securely held, without injury to the pipe or other article so received and held, which articles may also be quickly released.

In performing work upon pipes, tubes or rods of brass, copper, bronze, and other similarly expensive and valuable material, it is essential to provide means for holding such articles in a vise, which will not cut, mar, scratch or otherwise injure the surface or the material operated upon.

To this end I have produced my present novel device, which consists in a pair of clamping jaws, hinged together at one end, and having a plurality of cooperating graduated arcuate clamping depressions or recesses therein, these clamping depressions being constructed and arranged to hold pipes, tubes or rods of greatly varying sizes and diameters, the pipe or other article to be operated upon automatically falling into the depressions intended for that size of pipe.

If the pipe is too large to enter the lowest depressions, it will be stopped and held in the next higher depressions, and so on to the largest or highest pair of depressions, intended for pipes too large to fit in any of the lower depressions. These depressions are smooth on their interior faces, and thus effect a smooth grip on the article held thereby, without scratching, marring or injuring the same.

My novel clamping jaws as thus devised, may be applied to any existing form of bench vise, or bench pipe vise by slight adjustment, and I have also constructed same for application to the standard hinge pipe vise, wherein its greatest utility will be found. The present standard type of hinge pipe vise is preferably now equipped with serrated jaws for firm gripping of the pipes held therein, and I have so improved this standard form of hinge pipe vise, that my novel graduated clamping jaws can be interchanged with the serrated jaws with great facility. The serrated jaws still are useful for holding pipes of iron and the like, wherein no objectionable damage is done by the teeth of the jaws, but on finer work, such as brass, copper, nickel plated and the like piping or tubing, particularly where the same is used in open work, exposed to view, such scratches and marring would be unsightly, and hence the extreme importance of my novel clamping jaws, and their applicability to this type of work, will be greatly appreciated by those skilled in the art.

I believe that my novel graduated clamping jaws are new, and I wish to claim the same herein broadly.

I also believe that a hinge pipe vise, constructed and arranged for interchangeability of pipe holding jaws, is new, and I wish to claim the same herein.

Further features of the invention, novel combinations of parts, and advantages, will be hereinafter more fully pointed out and claimed.

Referring to the drawings, illustrating preferred embodiments and several modifications of my present invention, Fig. 1 is a front elevation of a hinge pipe vise with my novel graduated jaws therein;

Fig. 2 is a detail of a similar vise with serrated clamping jaws therein, illustrating the interchangeability of these two forms of clamping jaws;

Fig. 3 is a sectional detail illustrating the graduated clamping jaws open, and illustrating the capacity for receiving pipes of varying diameters in their appropriate depressions;

Fig. 4 is a side elevation of my graduated clamping jaws;

Fig. 5 is a bottom plan view of the same.

As shown in Fig. 1, I have utilized a standard hinge pipe vise comprising a base 1 with apertures 2, 2, 2 for bolting or securing to a bench or the like. To this base 1 a U-frame or bridge 3 is pivotally attached at 4. On the side of the U-frame 3 opposite its pivot 4 is pivotally mounted an arm 5, pivoted at 6, with a hooked end 7, adapted to engage a lug 8. This U-frame or bridge is reversible, since the location of same may require a reversal on the base, whereupon the bridge or U-frame would be pivoted at 9, and the hooked end 7 of the arm 5 would engage with the lug 10 to lock the bridge in position during operation of the vise. Midway of the upper portion of the bridge is an enlargement 11 having a threaded recess 12 therethrough, through which is fitted the threaded stem 13, having a customary handle 14. To the lower end of the stem 13 is attached a holding head 15, and secured thereto by a small head 16 on the stem 13. In the base 1 is formed a web 17, provided with a plurality of apertures 18. In Fig. 1 I illustrate my novel graduated clamping jaws 19 and 20, hinged at 21, by a bolt which passes through a central aperture 18 in the web 17. The clamping jaws 19 and 20 are provided with a plurality of cooperating graduated depressions or recesses 22, 23, 24, adapted to hold pipes or tubes of varying diameters, and said jaws are also provided with ribs 25, 26 and 27, dividing said recesses or depressions, and permitting admission to each of the graduated recesses of the pipe or the like intended for that recess only. A cam member 28 is secured to the head 15 by bolts or the like 29, this cam member being adapted to engage cam followers 30, 30 on the upper ends of the clamping jaws, and when said cam member is moved downwardly by the action of the threaded stem, to force the clamping jaws together, and thus exert a firm holding grip on a pipe or the like held in said depressions or recesses.

Fig. 3 illustrates in cross section my novel graduated clamping jaws in open position, to receive pipes or the like before clamping the same. The jaws are provided with webs 31, 31 and 32, 32. The webs 32 are so formed adjacent the pivot point of the jaws, that when the jaws are opened to the desired extended limit, these webs 32 will rest upon the cross web 17 in the base 1, the webs 32 thus acting as positive stops against further opening of the jaws.

The advantages of the graduations of the pipe holding recesses will be apparent from an inspection of Fig. 3. The smaller pipe 33 has been inserted from the top, and automatically descends to the recesses 24, intended therefor, being of a diameter to pass between the ribs 25. The pipe 34, shown in dotted lines, is of a diameter to pass through the ribs 26, but will not pass through the ribs 25, thus being retained in the recesses 23. The pipe 35 is of a diameter to pass through the ribs 27, but not through the ribs 26, thus being retained within the recesses 22. Thus, in Fig. 1, the pipe 33 having descended to the recesses 24, the bridge or U-frame 3 is closed, the hook 7 engaging the lug 8, and the stem 19 is threaded downwardly, the cam member 28 acting upon the jaws 19 and 20 to bring them together. Whereupon the pipe 33 is automatically seated in the recesses 24, and these recesses being of a smooth interior, an even, firm and non-marring grip is exerted upon the pipe 33. The same action would result with a pipe in any of the graduated recesses.

In Fig. 2 I have illustrated the interchangeability of gripping jaws in this same vise, wherein an upper jaw 36 with a serrated face 37 engages a pipe 38. Lower gripping jaws 39, of which but one is shown, with a serrated face 40, engage the opposite side of the pipe 38, and upon movement of the stem 13 downwardly these two jaws 36 and 39 grip the pipe therebetween and hold the same firmly. This type of jaws is desirable only in working on pipes or rods of iron or the like, where appearance is immaterial, and where the scratching or marring caused by the serrated faces of the jaws does no particular damage. The jaws 39 are secured to the web 17 by bolts 41, 41.

It will be appreciated that these jaws 36 and 39 can be readily removed, and the cam member 28 and graduated clamping jaws 19 and 20 substituted therefor, thus effecting a ready interchangeability of these clamping parts for a vise of this type, which constitutes an important element of my present invention.

Referring now to Figs. 4 and 5, I have illustrated a modification of my clamping jaws, for use in other forms of vises, although it will be appreciated that the form illustrated in Figs. 1, 2 and 3 can be utilized with equal facility. As shown in Figs. 4 and 5, I provide two jaws 50 and 51, hinged together by a bolt 52 and nut 53, each jaw having a longitudinal reinforcing web 54 and cross rib 55, to withstand the strains and pressure exerted thereupon by the vises in which same are to be used. These jaws have arcuate depressions therein, forming recesses 56, 57 and 58, graduated in size, for receiving and holding pipes or the like of varying diameters.

While my present invention of graduated clamping jaws is primarily intended for use in a vise of the kind illustrated in Fig. 1, it will be appreciated that I am not limited thereto, but may use these clamping jaws in any auxiliary vise or vise-like mechanism with equal facility, and such practice is within the province of my invention.

The operation of the device illustrated in Fig. 1 will now be described and readily understood. The arm 5 is released from the lug 8 and the bridge 3 swung open. Thereupon the jaws 19 and 20 open to their limit, predetermined position or capacity, being stopped by the webs 32 resting on the cross-web 17. Thereupon a pipe is dropped into the open jaws 19 and 20, passing through the graduated recesses until it is automatically stopped in the recess intended therefor, whereupon the bridge 3 is closed, arm 5 automatically locking on the lug 8, stem 13 threaded downwardly, and wedge 28 closes the jaws 19 and 20, automatically seating the pipe in whichever pair of recesses it has fallen, and the pipe is now rigidly and firmly held, ready for being operated upon.

While I have necessarily described my invention somewhat in detail, it will be appreciated that I am not limited thereto, but may vary the size, shape and arrangement of parts within reasonably wide limits without departing from the spirit of the invention.

A further feature of my present invention consists in the quick closing action of the clamping jaws 19 and 20 when the bridge 3 is closed. As clearly illustrated in Fig. 3, the ends 70 of the cam 28 engage the cam followers 30 when the bridge 3 is moved toward closing position, and when the bridge is in closed position, these ends 70 have brought the jaws 19 and 20 together and centralized the pipe held thereby, so that a slight turn, one-quarter or one-half of the screw 13, is all that is necessary to complete the clamping action of the jaws 19 and 20. This quick acting and closing feature is of importance, and greatly simplifies and facilitates the action of my novel device.

My invention is further described and defined in the form of claims as follows:

1. A pipe vise, comprising a base, a frame hinged on said base, means to lock said hinged frame on the base, graduated pipe clamping jaws hinged at said base, means to limit the opening of said jaws, and wedging means to bring said jaws into pipe clamping position.

2. A pipe vise comprising a base, a reversible frame hinged on said base, means to lock said frame on the base, pipe clamping jaws pivotally hinged on said base, means to limit the opening of said jaws to a predetermined extent, a plurality of graduated pipe holding and retaining recesses in said jaws, means to automatically seat in a pair of said recesses a pipe to be clamped therein, and means in said frame to bring said jaws into clamping position.

3. A pipe vise, comprising a base, a frame hinged on said base, means to lock said frame on the base, graduated pipe clamping jaws hinged at said base, cooperating means on the jaws and base to limit the opening of said jaws, and wedging means to bring said jaws into pipe clamping position.

4. A pipe vise, comprising a base, a frame hinged on said base, means to lock said frame on the base, graduated pipe clamping jaws hinged at said base, and cooperating means on the jaws and base located adjacent the pivot point of the jaws, to limit the opening of said jaws to a predetermined extent, and means to bring said jaws into pipe clamping position.

5. A pipe vise, comprising a base, a frame hinged on said base, means to lock said frame on the base, pipe clamping jaws hinged at said base, graduated arcuate pipe receiving and holding recesses in said jaws, and cooperating means on the jaws and base located adjacent the pivot point of the jaws, to limit the opening of said jaws to a predetermined extent, and wedging means to bring said jaws into pipe clamping position.

In testimony whereof, I have signed my name to this specification.

JOSEPH E. KENERSON.